US009684647B2

(12) United States Patent
Boguraev et al.

(10) Patent No.: US 9,684,647 B2
(45) Date of Patent: *Jun. 20, 2017

(54) DOMAIN-SPECIFIC COMPUTATIONAL LEXICON FORMATION

(71) Applicant: International Business Machines Corporation, Armonk, NY (US)

(72) Inventors: Branimir K. Boguraev, Bedford, NY (US); Esme Manandise, Tallahassee, FL (US); Benjamin P. Segal, Hyde Park, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 176 days.

This patent is subject to a terminal disclaimer.

(21) Appl. No.: 14/639,410

(22) Filed: Mar. 5, 2015

(65) Prior Publication Data

US 2016/0179783 A1     Jun. 23, 2016

Related U.S. Application Data

(63) Continuation of application No. 14/580,583, filed on Dec. 23, 2014.

(51) Int. Cl.
*G06F 17/27*     (2006.01)
*G06F 17/30*     (2006.01)

(52) U.S. Cl.
CPC ...... *G06F 17/2735* (2013.01); *G06F 17/2755* (2013.01); *G06F 17/30654* (2013.01)

(58) Field of Classification Search
USPC .......................................................... 704/9
See application file for complete search history.

(56) References Cited

PUBLICATIONS

List of IBM Patents or Patent Applications Treated as Related; Mar. 12, 2015, 2 pages.
U.S. Appl. No. 14/580,583, filed Dec. 23, 2014, Entitled: Domain-Specific Computational Lexicon Formation, First Named Inventor: Branimir K. Boguraev.
U.S. Appl. No. 14/593,015, filed Jan. 9, 2015, Entitled: Extraction of Lexical Kernel Units From a Domain-Specific Lexicon, First Named Inventor: Branimir K. Boguraev.
U.S. Appl. No. 14/644,291, filed Mar. 11, 2015, Entitled: Extraction of Lexical Kernel Units From a Domain-Specific Lexicon, First Named Inventor: Branimir K. Boguraev.

*Primary Examiner* — Charlotte M Baker
(74) *Attorney, Agent, or Firm* — Cantor Colburn LLP; William Stock

(57) ABSTRACT

According to an aspect, a candidate token sequence including one or more word tokens is extracted from an unstructured domain glossary that includes entries associated with a domain. A look-up operation is performed to retrieve language data for each word token in the candidate token sequence and annotates each word token in the candidate token sequence found by the look-up operation with corresponding retrieved language data to form an annotated sequence. A pattern match of the annotated sequence is performed relative to a repository of patterns and identifies a best matching pattern from the repository of patterns to the annotated sequence based on matching criteria. The annotated sequence is refined with lexical information associated with the best matching pattern as a refined annotated sequence. The candidate token sequence and the refined annotated sequence are output to a domain-specific computational lexicon file.

9 Claims, 7 Drawing Sheets

DOMAIN-SPECIFIC COMPUTATIONAL LEXICON FORMATION

DOMESTIC PRIORITY

This application is a continuation of U.S. application Ser. No. 14/580,583 filed Dec. 23, 2014, the disclosure of which is incorporated by reference herein in its entirety.

BACKGROUND

The present disclosure relates generally to language processing, and more specifically, to computationally forming a domain-specific computational lexicon from an unstructured domain glossary.

Parsers are a fundamental stepping stone to many different types of natural-language processing (NLP) applications and tasks. One such type of system that relies upon a parser is a question-answering computer system. Question-answering computer systems typically employ NLP to return a highest scoring answer to a question. NLP techniques, which are also referred to as text analytics, infer the meaning of terms and phrases by using a parser to analyze syntax, context, and usage.

Human language is so complex, variable (there are many different ways to express the same meaning), and polysemous (the same word or phrase may mean many things in different contexts) that NLP presents an enormous technical challenge. Decades of research have led to many specialized techniques each operating on language at different levels and on different isolated aspects of the language understanding task. These techniques include, for example, using a natural-language (NL) parser for parsing of data sources to build a knowledge base and analyze questions, candidate answers, and supporting evidence in the context of answering questions. In order for a NL parser to operate, a lexicon must be developed that associates syntactic and semantic information with its entries. Thus, for a NL parser to be effective, a well-formed and populated (broad and rich) lexicon is needed.

A parser needs, minimally, a lexicon for its common, domain-independent vocabulary, such as the common words in the English language. Then, additionally, the parser can be adapted—by extending its lexicon—to include domain-specific terms, such as all diseases, symptoms and treatments (for a medical domain), or chemical compounds and processes (for a natural science domain), and so forth. A domain-specific lexicon can include a collection of terms from a glossary; however, such a lexicon without syntactic and/or semantic information may not provide a sufficient level of information to drive a parser. A computational lexicon is a lexicon that includes syntactic and/or semantic information. One approach to forming a domain-specific lexicon is to analyze documents to identify technical terminology, which can include multiple or single word sequences augmented with little (if any) syntactic and/or semantic information. This may be sufficient for compiling glossaries or mapping out new domains for NLP applications. However, such terms are, a priori, not informative enough to be useful to a NL parser. This is because external lexical resources (such as pre-compiled glossaries, or simply lists of expressions culled from domain-specific texts) typically have little or no lexical information for individual terms. Thus, a large amount of manual annotation may be needed to create a domain-specific computational lexicon suitable for use by a NL parser.

SUMMARY

Embodiments include a method for forming a domain-specific computational lexicon. The method includes extracting a candidate token sequence including one or more word tokens from an unstructured domain glossary that includes a plurality of entries associated with a domain. A look-up operation is performed to retrieve language data for each word token in the candidate token sequence and annotates each word token in the candidate token sequence found by the look-up operation with corresponding retrieved language data to form an annotated sequence. A pattern match of the annotated sequence is performed relative to a repository of patterns and identifies a best matching pattern from the repository of patterns to the annotated sequence based on matching criteria. The annotated sequence is refined with lexical information associated with the best matching pattern as a refined annotated sequence. The candidate token sequence and the refined annotated sequence are output to a domain-specific computational lexicon file.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
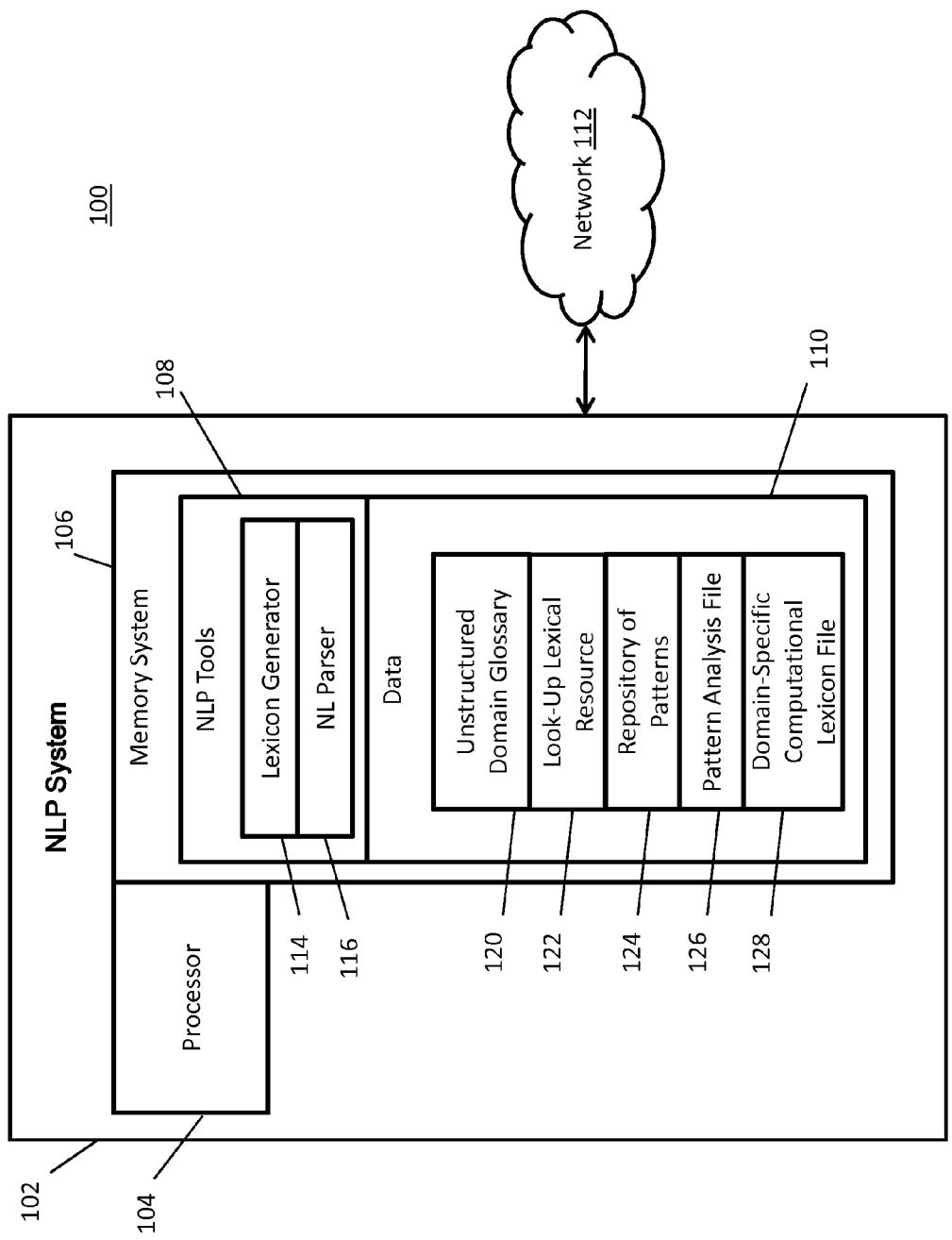
FIG. 1 depicts a block diagram of a system for forming a domain-specific computational lexicon in accordance with an embodiment.

Embodiments disclosed herein relate to forming a domain-specific computational lexicon from an unstructured domain glossary that includes a plurality of entries associated with a domain. Examples related to the medical field are described herein; however, embodiments are not limited to applications in the medical field. Embodiments can be utilized by any application that uses a lexicon, such as a natural-language (NL) parser for a domain-specific question-answer (QA) system. A domain-specific QA system can target specific domains, such as call center support, agent assist, or customer support for particular products and/or services offered.

As one example, in the medical domain, a vast number of knowledge sources exist. Medical domain information is growing and changing extremely quickly, making it difficult to keep resources that leverage this information up to date. Broad coverage of the medical domain has already been captured in the Unified Medical Language System® (UMLS) knowledge base (KB), which includes medical concepts, relations, and definitions. The UMLS KB is a compendium of many vocabularies in the biomedical sciences and may be viewed as a comprehensive thesaurus of biomedical concepts. It provides a mapping structure among these vocabularies and thus allows translation among the various terminology systems. The 2013 version of the UMLS KB contains information about millions of concepts from over 160 source vocabularies. However, entry of data in the UMLS KB is not always well controlled, which results in a number of entries that are poorly formed to use for lexical analysis, such as including full sentences, using diacritics, and having traces of noisy data tags (e.g., embedded hypertext markup language tags). In essence, contrary to expectations, not all entries in the UMLS KB are suitable for inclusion in a computational lexicon to be used by a NL parser.

Within domain-specific texts to be processed for extraction and acquisition of lexical entries, many lexical phrases (and, therefore, candidate token sequences) are unexceptional in terms of syntactic and semantic behavior. Yet, such sequences may be judged by human specialists to form, in their domain, classificatory units. One example of such a data set (data set (a) in this example) includes the terms: "small lesion", "cauterization of lesion", "excision of lesion of skull", and "excision of intradural lesion of base of posterior cranial fossa". According to traditional lexicography principles, the phrases in data set (a) do not qualify for inclusion in a lexicon since they do not exhibit unpredictable, fuzzy syntactic and/or semantic behavior. In contrast, phrases in another example data set (data set (b)) represent typical candidates for inclusion in a lexicon: "deficiency disease", "gross haematuria", "small intestine", and "surgical patient". Clearly, "surgical patient" in data set (b) cannot be paraphrased as "a patient who is surgical" in the way one can paraphrase "young patient" as "a patient who is young". While it is true that syntactic and semantic degree of transparency may be considered as criteria for inclusion in a lexicon, such transparency is not required, and for certain cases, is also unadvised. For example, there may be an application requirement that phrases of text remain as unaltered units in the lexicon (e.g., "smooth skin lesion"). One particular reason may be to preserve certain metadata attributes, or characteristics of the phrase, which were defined in a domain-specific resource and cannot otherwise be defined compositionally.

Furthermore, considering phrases such as "small lesion" and "small intestine" side by side, exemplifies the difficulty in determining when and why phrases become fully-lexicalized. "Small intestine" is a lexicalized unit (which happens to have crossed over into a general domain) because "small" exists in a binary opposition to "large intestine". The property "small" in "small lesion", on the other hand, exists along a continuum. Yet, for medical specialists, the presence of a "small lesion" may be cause for concern as it could point to a medical condition. In the case of "small lesion", the classificatory opposition is "small" versus "non-existent". Healthy organs and tissues should not have lesions no matter how small.

Exemplary embodiments for domain-specific lexical extraction and acquisition treat phrases in data sets (a) and (b) in a uniform manner. For a domain-specific process of lexical extraction and acquisition, classificatory relevance (together with a frequency of occurrence threshold) trumps degree of syntactic and semantic transparency for inclusion in a lexicon.

A block diagram of a system 100 is generally shown in FIG. 1 that includes a natural-language processing (NLP) system 102. The NLP system 102 can be implemented in a variety of computer systems, such as a server, a desktop computer, a workstation, a laptop computer, a tablet computer, a mobile device, and/or a cloud computing system. The NLP system 102 includes at least one processor 104 and a memory system 106 (also referred to as memory 106). The processor 104 can be any type of processing circuitry or microcontroller, including multiple instances thereof, that is configurable to execute processes further described herein, where the memory system 106 is an example of a tangible storage medium. The memory system 106 can include NLP tools 108, data 110, and other supporting programs (not depicted) such as an operating system, a script interpreter, a file management system, and the like. The NLP tools 108 may be partitioned as one or more computer program products. For example, the NLP tools 108 can include a lexicon generator 114 and a NL parser 116 among other executable applications (not depicted). As another example, the lexicon generator 114 can include a pattern-matching engine or a pattern-matching engine can be a separate application (not depicted) in the NLP tools 108. The data 110 can include a variety of records, files, and databases, such as an unstructured domain glossary 120, a look-up lexical resource 122, a repository of patterns 124, a pattern analysis file 126, a domain-specific computational lexicon file 128, and other data (not depicted) as further described herein. The unstructured domain glossary 120 is an input to the lexicon generator 114, and the domain-specific computational lexicon file 128 is an output of the lexicon generator 114.

In an exemplary embodiment, the processor 104 is coupled to the memory system 106. The processor 104 is configured to execute the lexicon generator 114 to analyze the unstructured domain glossary 120 and generate the domain-specific computational lexicon file 128. The UMLS KB is one example of the unstructured domain glossary 120 that includes several million entries, such as diseases, treatments, and symptoms. Other similarly structured KBs may be used for other domains such that the unstructured domain glossary 120 includes a plurality of phrasal entries associated with a domain. The look-up lexical resource 122 can be one or more files with a list of base terms including part of speech information, syntactic, and semantic information. The look-up lexical resource 122 typically starts off as an existing computational lexicon (e.g. for the general language domain); it can be populated and further enhanced as the lexicon generator 114 encounters more terms in the unstructured domain glossary 120. The look-up lexical resource 122 need not be included initially, as the look-up lexical resource 122 can be derived and populated through morphological decomposition of the unstructured domain glossary 120. The look-up lexical resource 122 may be a domain independent lexical resource (as in, common English language words), along with dynamically generated lexical resources by virtue of processing sequences of word tokens for a given domain. Each word token represents a term that can include one or more words as a single unit.

The repository of patterns 124 defines expected sequences of parts of speech and/or other expected sequences of lexical information, such as part-of-speech contours along with syntactic and/or semantic features. A "part-of-speech contour" refers to the sequence of part-of-speech tags that characterize acceptable token sequences. Thus, for instance, "DET ADJ* NOUN" is one part-of-speech contour for a noun phrase. For each word token in a sequence (which underlies any given part-of-speech contour) there can be syntactic, and possibly semantic, features. The pattern analysis file 126 can be used to record data sequences that cannot be resolved using the repository of patterns 124. Upon subsequent analysis of the pattern analysis file 126, patterns that are determined to be acceptable for the domain, e.g., occurring in a significant number or above a threshold frequency can result in adding the patterns to the repository of patterns 124 for future use. The domain-specific computational lexicon file 128 contains annotated results for each successfully identified candidate token sequence from the unstructured domain glossary 120. The domain-specific computational lexicon file 128 may be subjected to further processing or be directly usable by the NL parser 116, deployed for instance, as part of a domain-specific QA system. Although the NLP tools 108 and data 110 are depicted in the memory system 106 local to the processor 104, it will be appreciated that one or more portions of the NLP tools 108 and data 110 can be located remotely, e.g., across a network 112 that is accessible by the NLP system 102.

Figure 2:
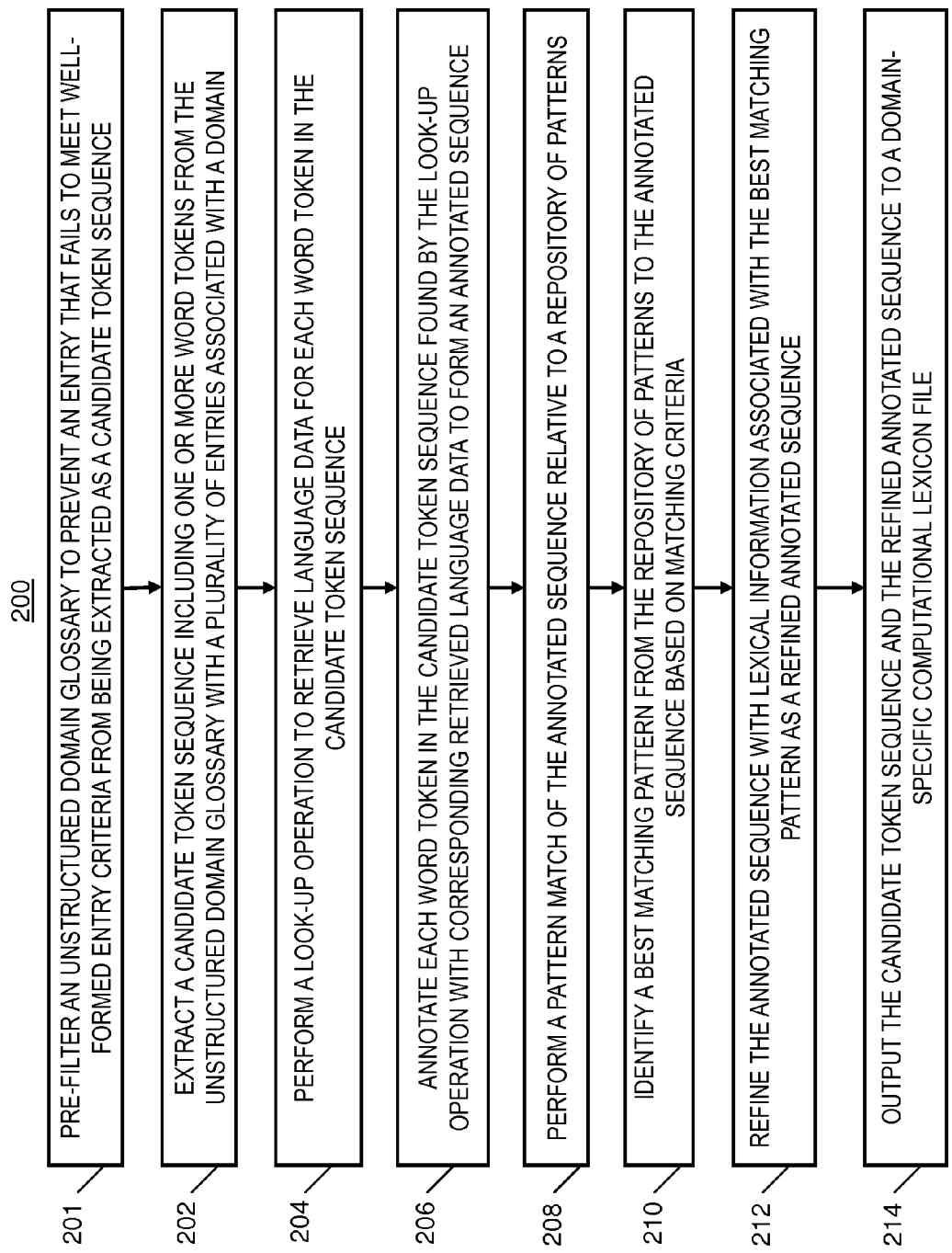
FIG. 2 depicts an example of a process flow for forming a domain-specific computational lexicon in accordance with an embodiment.

FIG. 2 depicts a process flow 200 for forming a domain-specific computational lexicon in accordance with an embodiment, such as the domain-specific computational lexicon file 128 of FIG. 1. For purposes of explanation, the process flow 200 is described in terms of the example of FIG. 1 but can be implemented on various system configurations.

At block 201, prior to extracting candidate token sequences from the unstructured domain glossary 120, the lexicon generator 114 can pre-filter the unstructured domain glossary 120 to prevent an entry that fails to meet one or more well-formed entry criteria from being extracted as a candidate token sequence for inclusion in the domain-specific computational lexicon file 128. For unstructured text, pre-filtering can isolate and determine whether an entry of one or more word tokens from the unstructured domain glossary 120 is a reasonable candidate for extraction and subsequent addition to the domain-specific computational lexicon file 128. Initially, ungrammatical strings and strings that do not meet pre-defined, non-prescriptive well-formedness criteria may be filtered out. Examples of discarded input strings as candidates for lexical extraction and acquisition include: "5 ml prefilled syringe 1 ml hyperhep b 217 unt/ml injectable solution includes 0.5 ml", which appears to be a full sentence. As another example, "run like 1=>mg albumin" has a part of speech ambiguity ("run") and diacritics, and therefore is discarded. As a further example, "run like <sup>aggregated</sup> albumin" can be excluded as noisy with embedded hypertext markup language tags. Entries in the unstructured domain glossary 120 that make it out of pre-filtering can be set aside for further processing as candidate token sequences. If the unstructured domain glossary 120 has already been pre-filtered, the pre-filtering of block 201 may be skipped or omitted from the process 200.

At block 202, when executing the lexicon generator 114, the processor 104 can extract a candidate token sequence that includes one or more word tokens from the unstructured domain glossary 120, where the unstructured domain glossary 120 includes a plurality of entries associated with a domain (e.g., a medical domain). The lexicon generator 114 can also perform a morphological decomposition of the individual word tokens in the candidate token sequence to identify base forms of at least one of the word tokens in the candidate token sequence and use the base forms in a look-up operation. In an embodiment, the morphological decomposition is performed on each of the word tokens in the candidate token sequence.

At block 204, when executing the lexicon generator 114, the processor 104 can perform a look-up operation to retrieve language data for each word in the candidate token sequence based on the look-up lexical resource 122. At block 206, when executing the lexicon generator 114, the processor 104 can annotate each word token in the candidate token sequence found by the look-up operation with corresponding retrieved language data to form an annotated sequence. Each individual word or word token can have a look-up/morphological decomposition result. Words in the candidate token sequence that are unknown can be annotated as "unknown" words based on an inability of the look-up operation to locate language data about the words. A set of heuristics can be applied by the lexicon generator 114 to attempt to resolve, minimally, a part of speech for each unknown word. An entry may be added to the look-up lexical resource 122 based on resolving each unknown word.

At block 208, when executing the lexicon generator 114, the processor 104 can perform a pattern match of the annotated sequence relative to the repository of patterns 124, as further described herein. At block 210, when executing the lexicon generator 114, the processor 104 can identify a best matching pattern from the repository of patterns 124 to the annotated sequence based on matching criteria. The pattern matching may attempt to resolve part-of-speech ambiguities in the annotated sequence for words having multiple candidate parts of speech. Matching criteria can include scoring for how close a sequence including particular parts of speech, syntactic, and/or semantic information align between the annotated sequence and one or more patterns in the repository of patterns 124. Further examples of patterns and pattern matching are provided in reference to the example of FIG. 3.

Continuing with the process 200 of FIG. 2, at block 212, when executing the lexicon generator 114, the processor 104 can refine the annotated sequence with lexical information associated with the best matching pattern as a refined annotated sequence. For example, lexical phrase analysis of the annotated sequence can be performed to identify a candidate head of phrase. The refined annotated sequence can be augmented based on identifying the candidate head of phrase of the annotated sequence.

At block 214, when executing the lexicon generator 114, the processor 104 can output the candidate token sequence and the refined annotated sequence to the domain-specific computational lexicon file 128. Each candidate token sequence in combination with the refined annotated sequence written to the domain-specific computational lexicon file 128 can form a complete entry in the domain-specific computational lexicon file 128. The look-up lexical resource 122 may also be updated to incorporate information captured in the refined annotated sequence. The extracting, looking-up, annotating, and pattern matching of blocks 202-208 are repeated for additional candidate token sequences such that all of the candidate token sequences may be processed. Based on determining that a matching pattern cannot be located in the repository of patterns 124, the lexicon generator 114 can record instances of additional annotated sequences corresponding to the candidate token sequences in the pattern analysis file 126.

Each of the candidate token sequences fit for lexical acquisition may be annotated where each word token in each of the candidate token sequences is assigned a part of speech. If a word cannot be assigned a standard part of speech, such as adjective (<adj>), or noun (<noun>), or preposition (<prep>), etc. . . . , it can be assigned a part of speech of "unknown" or <unk>. As applied to the example of data set (a) as previously described, the annotation results in a simplified representation of a candidate token sequence may include the example values provided in Table 1. All of the patterns with no duplication are collected into the repository of patterns 124 as:
<adj><noun>,
<noun><adj><prep><noun>,
<noun><prep><noun><prep><noun>, and
<noun><prep><unk><noun><prep><noun><prep><adj>
  <adj><unk> based on the example of Table 1.

TABLE 1

Example part of speech sequences for candidate token sequences

| Candidate token sequence | Part of Speech Sequence |
|---|---|
| small lesion | <adj><noun> |
| small intestine | <adj><noun> |
| surgical patient | <adj><noun> |
| pain severe at night | <noun><adj><prep><noun> |
| anxiety moderate at bedtime | <noun><adj><prep><noun> |
| excision of lesion of skull | <noun><prep><noun><prep><noun> |
| excision of intradural lesion of | <noun><prep><unk><noun><prep> |
| base of posterior cranial fossa | <noun><prep><adj><adj><unk> |

The repository of patterns 124 includes all of the patterns instantiated in the unstructured domain glossary 120 after applying the pre-filtering of block 201. Patterns in the repository of patterns 124 may correspond to domain-independent grammatical patterns such as <adj><noun> instantiated by "small intestine", domain-specific grammatical patterns such as <noun><adj><prep><noun> instantiated by "pain severe at night", domain-dependent and independent patterns with unknowns or <unk>, such as <adj><unk> instantiated by "precocious pseudopuberty", <unk><noun> instantiated by "borna disease", and <unk><unk> instantiated by "abrotanella spathulata".

Collected patterns in the repository of patterns 124 may reflect the inventory of part of speech sequences in the unstructured domain glossary 120. For example, the inclusion of the <unk> part of speech in repository of patterns 124 can capture the state of corpus data where content words belong to an endless open class and where many words in the unstructured domain glossary 120 are not listed in the look-up lexical resource 122 used to retrieve information about the words. In addition, patterns with <unk> allow for indeterminacy in the analysis since some words may never be known. For instance, the unstructured domain glossary 120 can contain words borrowed from other languages. Borrowed words can be found in a mix of an otherwise English phrase. Whenever possible (e.g., at later stage of processing), <unk> can be replaced by a standard part of speech. However, when there is no successful resolution, patterns with <unk> parts of speech can still be used to determine the overall structure of a phrase.

For those phrases with word-level annotations (e.g., parts of speech, including non-standard parts of speech such as <unk>) that match a defined pattern in the repository of patterns 124, lexical acquisition can occur. For those phrases with word-level annotations that cannot be matched to a known pattern, immediate lexical acquisition cannot occur, but the annotations are written to the pattern analysis file 126 for a lexicographer to examine. When the annotation sequences are examined, new domain specific patterns may be extrapolated from them. The domain specific patterns can be added to the repository of patterns 124 such that lexical acquisition of new domain specific phrases may occur. One example of a pattern that frequently occurs in a medical domain, but not generally in typical English language is a <noun><adj> sequence (cf. example lines 5 and 6 in Table 1).

Figure 3:
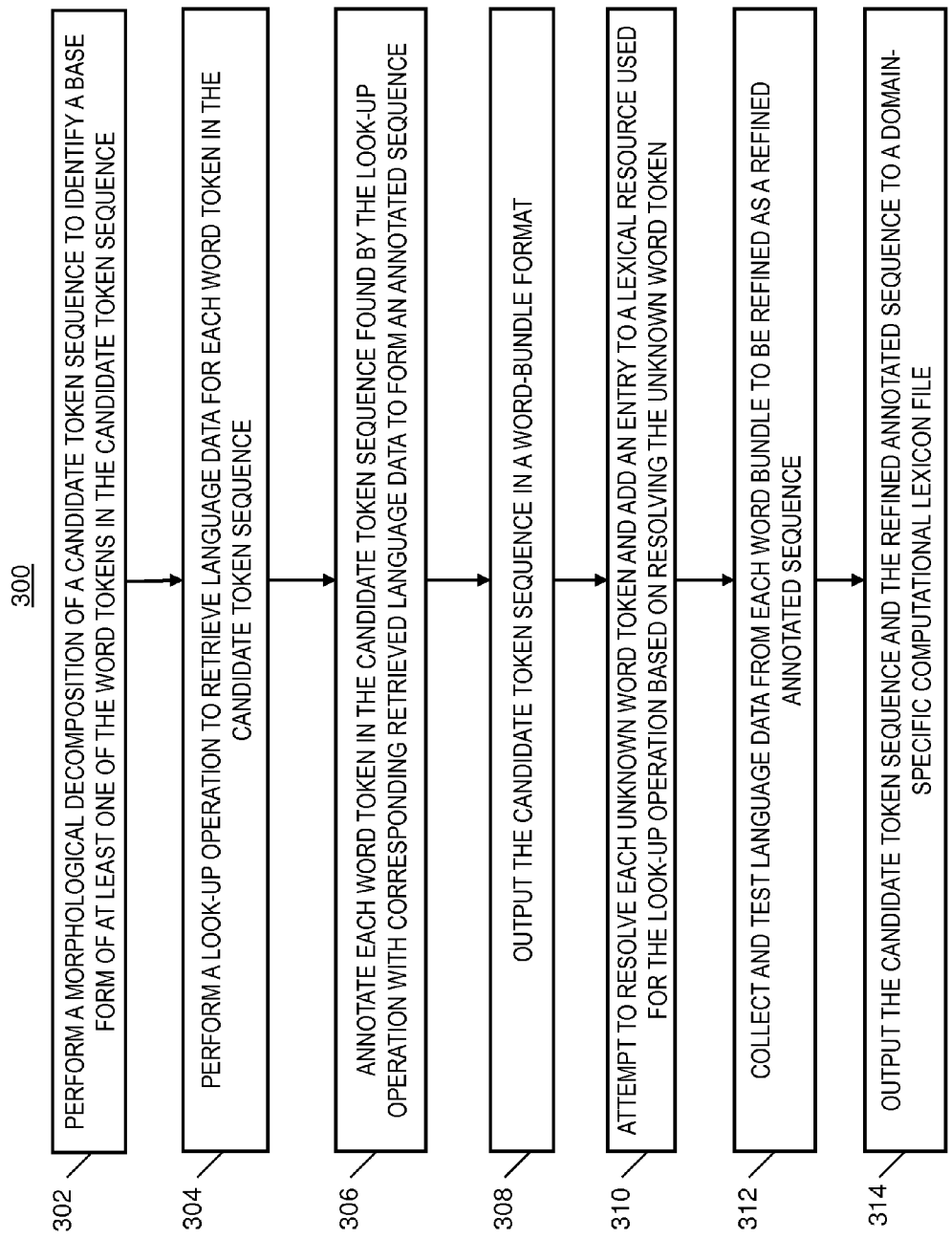
FIG. 3 depicts another example of a process flow for forming a domain-specific computational lexicon in accordance with an embodiment.
Figure 4:
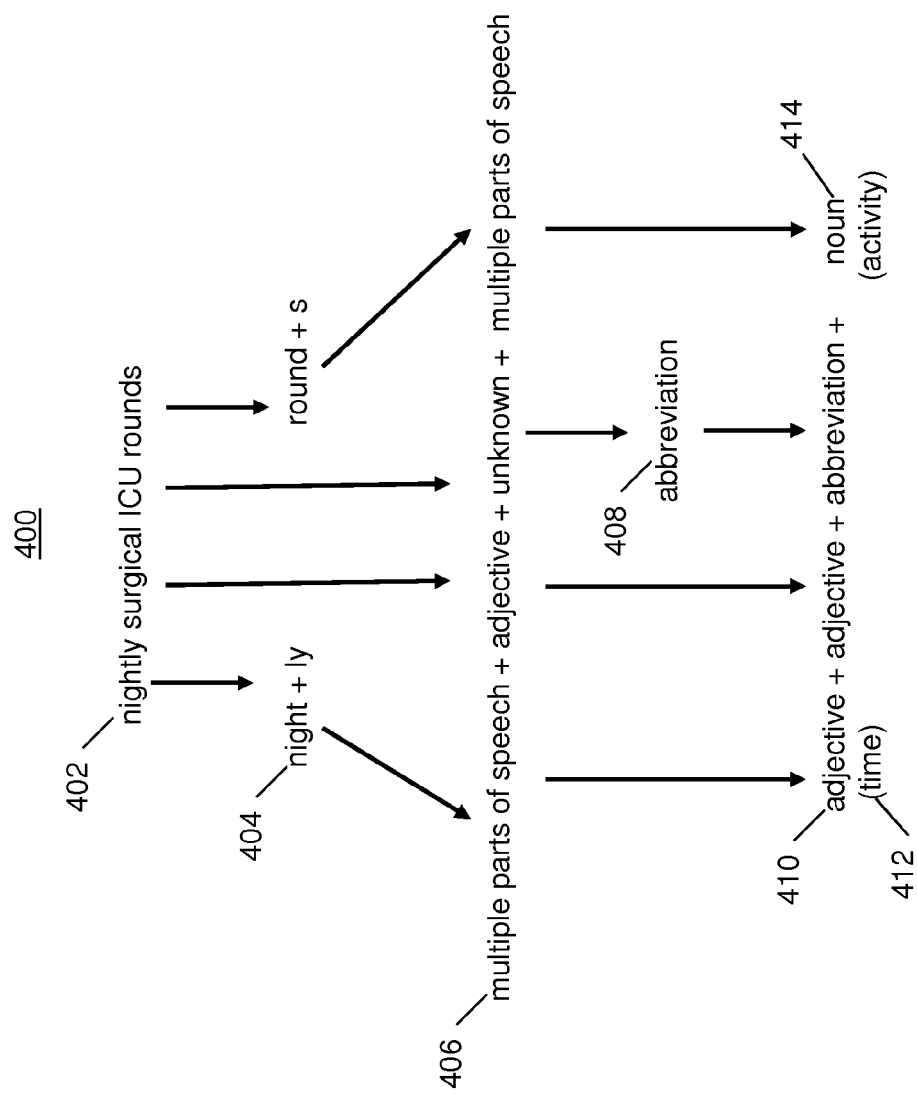
FIG. 4 depicts an example of operations for forming a domain-specific computational lexicon in accordance with an embodiment.

FIG. 3 depicts a process flow 300 for forming a domain-specific computational lexicon in accordance with an embodiment, such as the domain-specific computational lexicon file 128 of FIG. 1. Although depicted separately, the process flows 200 and 300 of FIGS. 2 and 3 can be merged in whole or in part. For purposes of explanation, the process flow 300 is described in terms of the examples of FIGS. 1-4 but can be implemented on various system configurations. FIG. 4 depicts an example of operations 400 for forming a domain-specific computational lexicon in accordance with an embodiment. In the example of FIG. 4 and as further described in reference to FIG. 3, an example of a candidate token sequence 402 is depicted as "nightly surgical ICU rounds" which can be extracted from the unstructured domain glossary 120 by the lexicon generator 114. Blocks 201 and 202 of the process 200 of FIG. 2 can be performed prior to block 302 of FIG. 3 to pre-filter and extract the candidate token sequence 402.

At block 302, a morphological decomposition of the candidate token sequence 402 is performed to identify a base form of at least one of the word tokens in the candidate token sequence 402. A morphological pass results in a decomposition 404 of "nightly" into "night+ly" and "rounds" into "round+s", where "night"/"round" are examples of base forms of "nightly"/"rounds".

At block 304, a look-up operation can be performed against the look-up lexical resource 122 to retrieve language data for each word token in the candidate token sequence 402, such as for "round" (from the decomposition of "rounds") with multiple parts of speech and syntactic/semantic information:
  round—preposition
  round—adjective
  round—verb object (particles down up) (prepositions for with)
  round—noun object shape activity The word "night" (from "nightly") may also be identified as multiple parts of speech. In case of an unsuccessful match, i.e., where no language data about a word token is found, the original word can be returned with a part of speech of "unknown".

At block 306, each word token in the candidate token sequence that was found by the look-up operation of block 304 is annotated with corresponding retrieved language data to form an annotated sequence. Sequence 406 depicts a generic example of part-of-speech data that link back to the candidate token sequence 402 to form an annotated sequence.

At block 308, the candidate token sequence 402 can be output in a word-bundle format. A word-bundle format can include an annotation of each word token in the candidate token sequence 402 with language data from the look-up operation of block 304. For example, a word-bundle format for "round" can include part of speech tags and syntactic/semantic information such as:

```
round <wdb>
    preposition
    adjective
    verb [object
        particle:down particle:up preposition:for preposition:with]
    noun [shape activity preposition:of]
</wdb>
```

The candidate token sequence 402 of "nightly surgical ICU rounds" may be output in a word-bundle format as: "nightly<wdb>adjective time—adverb time </wdb> surgical<wdb>adjective</wdb> ICU<wdb>unknown</wdb> round<wdb>preposition—adjective—verb [object particle: down particle: up preposition: for preposition: with]—noun [shape activity preposition:of]</wdb>".

At block 310, an attempt is made to resolve each unknown word token and add an entry to a lexical resource (e.g., look-up lexical resource 122) used for the look-up operation based on resolving the unknown word token. For each <wdb>unknown</wdb>, an attempt can be made to resolve it through further morphological decomposition and/or a chosen set of heuristics so as to replace <wdb>unknown</wdb> with at least a part of speech. If the word token remains unresolved, the word bundle "unknown" will be the part of speech for that word bundle. As depicted in FIG. 4, "ICU" resolves from "unknown" to "abbreviation" ("abbrev") 408 through applying heuristics (in this example).

If there are word bundles with more than one part of speech in them, as in the word bundles for "nightly" or "round", grammar rules and additional morphological derivations, along with syntactic surroundings, can be used to determine a most likely part of speech candidate for each word token. Some part of speech combinations can be excluded at the outset, given basic grammatical constraints: for example, the sequence <wdb>adjective</wdb> <wdb>adjective</wdb> <wdb>abbrev</wdb> <wdb>preposition</wdb> is inadmissible in English. In this example, "nightly surgical ICU rounds", there are at least two possible sequences, matching the patterns <wdb>adjective</wdb> <wdb>adjective</wdb> <wdb>abbrev </wdb><wdb>noun</wdb>, and <wdb>adverb</wdb> <wdb>adjective</wdb> <wdb> abbrev </wdb> <wdb>noun</wdb>. Choosing the most likely pattern (if more than one available) would, in effect, disambiguate among multiple parts of speech. The choice is driven by various constraints, chief among these being frequency of occurrence of word tokens (and associated parts of speech) determined separately over the entire glossary resource. Thus "nightly" gets resolved as having an 'adjective' part of speech.

At block 312, language data from each word bundle can be collected and tested to be refined as a refined annotated sequence 410 relative to the candidate token sequence 402. Refinements can include augmenting with syntactic/semantic information 412 and determining the head 414 of a lexical phrase, together with its modifiers (phrase structure). Further refinements may include weighing language data to be output and augmenting language data of the candidate head of phrase. Before deleting data from word bundles of non-head words, word tokens which were originally unknown but have been resolved can become part of the look-up lexical resource 122 to supply language data for subsequent lexical acquisition. Rather than being "unknown" in subsequent phrasal encounter during processing, the word token "ICU" in "ICU surgical team" can be associated with a word bundle that reads <wdb> noun abbrev </wdb>.

At block 314, the candidate token sequence 402 and the refined annotated sequence 410 can be output to the domain-specific computational lexicon file 128. For example, lexical phrase output to the domain-specific computational lexicon file 128 can include an entry of:

"nightly surgical ICU round" noun activity time
[[nightly] [surgical] [ICU] round]

The notation used here indicates that the entry, in double quotes, has the following lexical features: part-of-speech ("noun"), semantic features ("time" and "activity"), and phrasal structure of three pre-modifiers to the head ("round").

As another example, a candidate token sequence can include "free fatty acid-albumin complex". Morphological decomposition, look-up, and annotation can be performed as previously described with respect to blocks 302-306. In this example, the hyphenated word "acid-albumin" may not be found in the look-up lexical resource 122 and is therefore annotated as "unknown". The part of speech for the word "complex" may resolve to multiple parts of speech, such as an adjective, noun, or verb. Pattern testing against the repository of patterns 124 can be performed for a pattern of: adjective, adjective, unknown, (adjective/noun/verb). A best matching pattern may be identified as the pattern: adjective, adjective, unknown, noun, and thus "complex" resolves to a noun and can be marked as the head of the phrase.

Figure 5A:
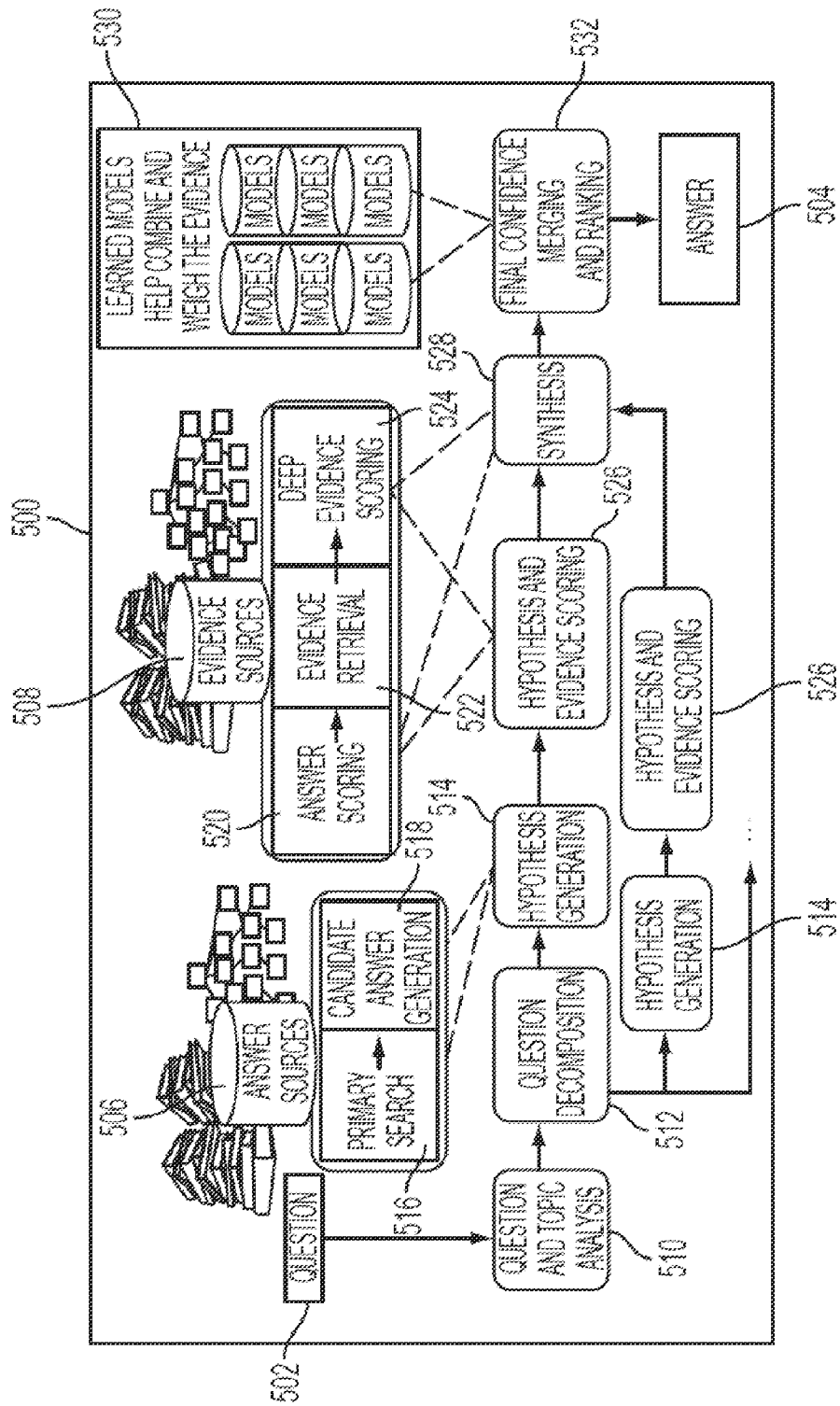
FIG. 5A depicts a high-level block diagram of a question-answer (QA) framework where embodiments of the domain-specific computational lexicon can be utilized in accordance with an embodiment.

Turning now to FIG. 5A, a high-level block diagram of a question-answer (QA) framework 500 where embodiments described herein can be utilized is generally shown. The QA framework 500 can be implemented on a separate computer system from the NLP system 102 of FIG. 1 or may be executed on the NLP system 102 but separately from the lexicon generator 114 of FIG. 1. In general, the QA framework 500 is operable after the lexicon generator 114 of FIG. 1 creates one or more instances of the domain-specific computational lexicon file 128 of FIG. 1 for use by the NL parser 116 of FIG. 1.

The QA framework 500 can be implemented to generate a ranked list of answers 504 (and a confidence level associated with each answer) to a given question 502. In an embodiment, general principles implemented by the framework 500 to generate answers 504 to questions 502 include massive parallelism, the use of many experts, pervasive confidence estimation, and the integration of shallow and deep knowledge. In an embodiment, the QA framework 500 shown in FIG. 5A is implemented by the Watson™ product from IBM.

The QA framework 500 shown in FIG. 5A defines various stages of analysis in a processing pipeline. In an embodiment, each stage admits multiple implementations that can produce alternative results. At each stage, alternatives can be independently pursued as part of a massively parallel computation. Embodiments of the framework 500 don't assume that any component perfectly understands the question 502 and can just look up the right answer 504 in a database. Rather, many candidate answers can be proposed by searching many different resources, on the basis of different interpretations of the question (e.g., based on a category of the question.) A commitment to any one answer is deferred while more and more evidence is gathered and analyzed for each answer and each alternative path through the system.

As shown in FIG. 5A, the question and topic analysis 510 can be performed and used in question decomposition 512. Hypotheses are generated by the hypothesis generation block 514 which uses input from the question decomposition 512, as well as data obtained via a primary search 516 through the answer sources 506 and candidate answer generation 518 to generate several hypotheses. Hypothesis and evidence scoring 526 is then performed for each hypothesis using evidence sources 508 and can include answer scoring 520, evidence retrieval 522 and deep evidence scoring 524.

A synthesis 528 is performed of the results of the multiple hypothesis and evidence scorings 526. Input to the synthesis 528 can include answer scoring 520, evidence retrieval 522, and deep evidence scoring 524. Learned models 530 can then be applied to the results of the synthesis 528 to generate a final confidence merging and ranking 532. A ranked list of answers 504 (and a confidence level associated with each answer) is then output.

Figure 5B:
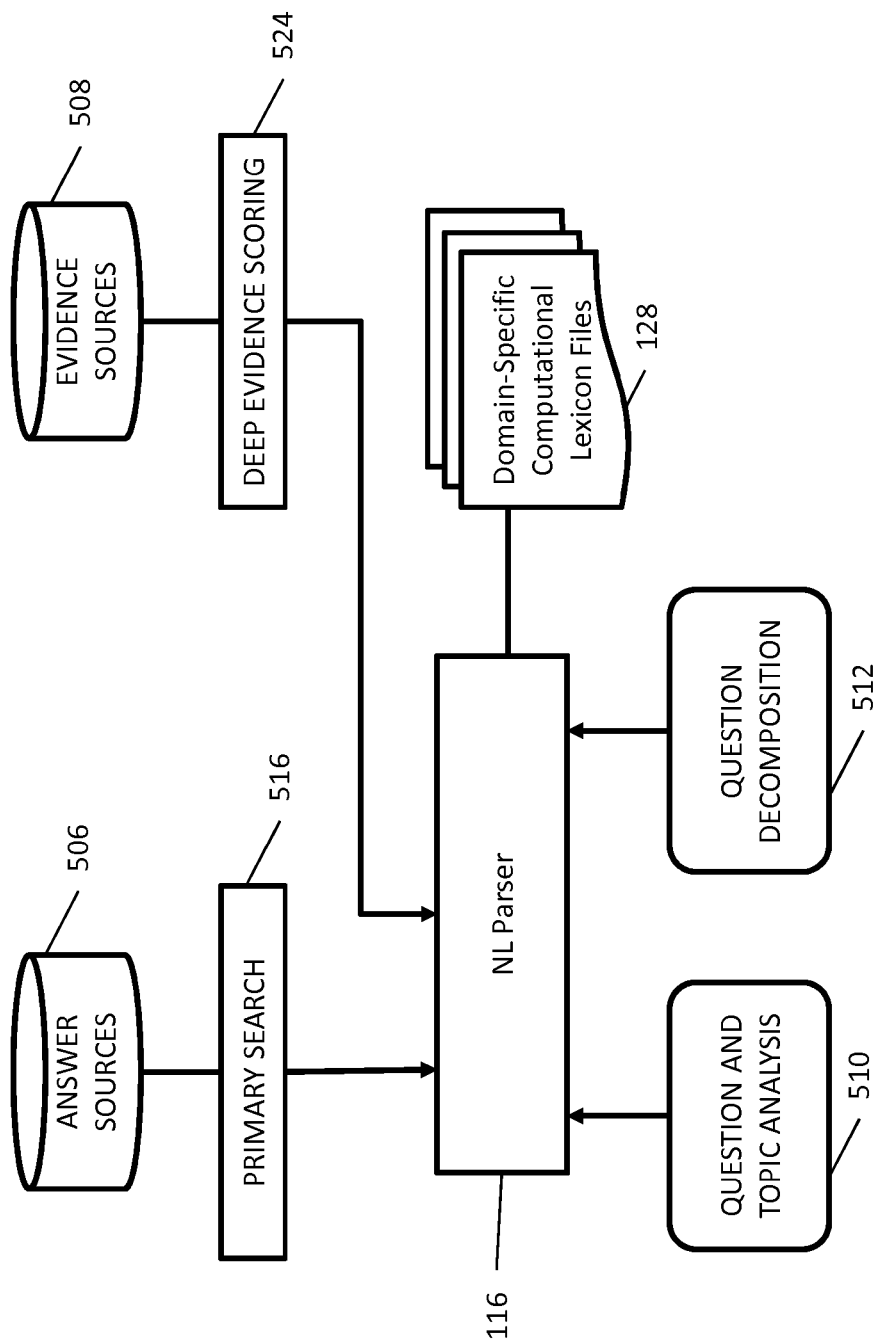
FIG. 5B depicts uses of domain-specific computational lexicon files by the QA framework of FIG. 5A in accordance with an embodiment.

The QA framework 500 shown in FIG. 5A can utilize embodiments of the NL parser 116 of FIG. 1 in combination with one or more instances of domain-specific computational lexicon files 128 of FIG. 1 described herein to parse the answer sources 506 and the evidence sources 508 as part of the primary search 516 and deep evidence scoring 524 as depicted in greater detail in FIG. 5B. The NL parser 116 can also utilize the domain-specific computational lexicon files 128 as part of question and topic analysis 510 and question decomposition 512 as depicted in FIG. 5B. The NL parser 116 in combination with one or more instances of the domain-specific computational lexicon file 128 may also be used by other elements of the QA framework 500. The efficiency and effectiveness of the NL parser 116 may be directly impacted by the accuracy and breadth of coverage in the domain-specific computational lexicon files 128 as populated by the lexicon generator 114 of FIG. 1.

Figure 6:
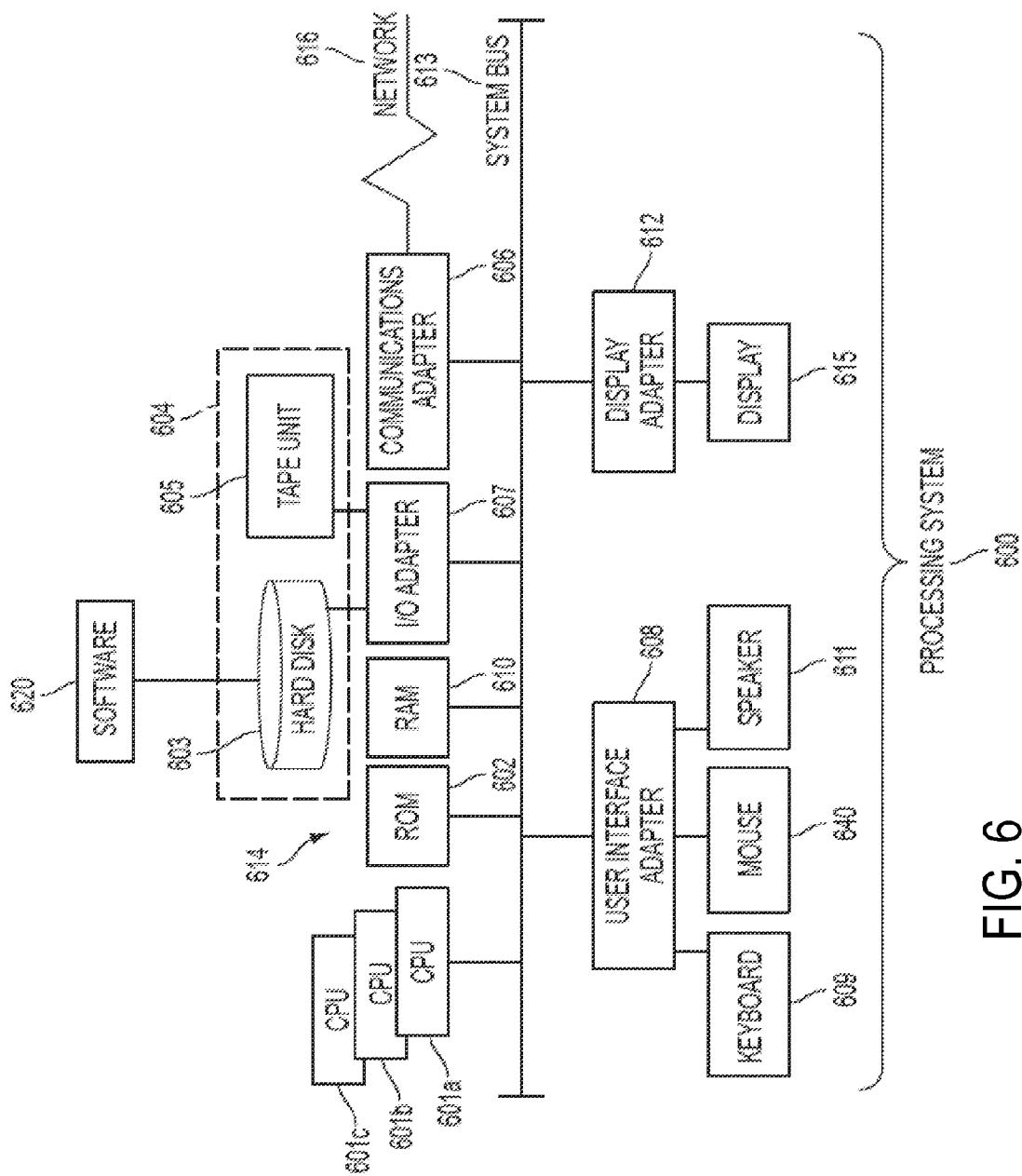
FIG. 6 depicts a processing system in accordance with an embodiment.

Referring now to FIG. 6, there is shown an embodiment of a processing system 600 for implementing the teachings herein. In this embodiment, the processing system 600 has one or more central processing units (processors) 601a, 601b, 601c, etc. (collectively or generically referred to as processor(s) 601). Processors 601, also referred to as processing circuits, are coupled to system memory 614 and various other components via a system bus 613. Read only memory (ROM) 602 is coupled to system bus 613 and may include a basic input/output system (BIOS), which controls certain basic functions of the processing system 600. The system memory 614 can include ROM 602 and random access memory (RAM) 610, which is read-write memory coupled to system bus 613 for use by processors 601.

FIG. 6 further depicts an input/output (I/O) adapter 607 and a network adapter 606 coupled to the system bus 613. I/O adapter 607 may be a small computer system interface (SCSI) adapter that communicates with a hard disk 603 and/or tape storage drive 605 or any other similar component. I/O adapter 607, hard disk 603, and tape storage drive 605 are collectively referred to herein as mass storage 604. Software 620 for execution on processing system 600 may be stored in mass storage 604. The mass storage 604 is an example of a tangible storage medium readable by the processors 601, where the software 620 is stored as instructions for execution by the processors 601 to perform a method, such as the process flows 200 and 300 of FIGS. 2 and 3. Network adapter 606 interconnects system bus 613 with an outside network 616 enabling processing system 600 to communicate with other such systems. A screen (e.g., a display monitor) 615 is connected to system bus 613 by display adapter 612, which may include a graphics controller to improve the performance of graphics intensive applications and a video controller. In one embodiment, adapters 607, 606, and 612 may be connected to one or more I/O buses that are connected to system bus 613 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 613 via user interface adapter 608 and display adapter 612. A keyboard 609, mouse 640, and speaker 611 can be interconnected to system bus 613 via user interface adapter 608, which may include, for example, a Super I/O chip integrating multiple device adapters into a single integrated circuit.

Thus, as configured in FIG. 6, processing system 600 includes processing capability in the form of processors 601, and, storage capability including system memory 614 and mass storage 604, input means such as keyboard 609 and mouse 640, and output capability including speaker 611 and display 615. In one embodiment, a portion of system memory 614 and mass storage 604 collectively store an operating system to coordinate the functions of the various components shown in FIG. 6.

Technical effects and benefits include creation of a domain-specific computational lexicon file to improve the performance of a natural-language parser targeting an associated domain. Efficient creation of a domain-specific computational lexicon file reduces turnaround time when incorporating updates and can handle a number of unknown terms and/or terms having multiple possible parts of speech using pattern matching. Embodiments may also reduce effort for domain adaption of a lexicon file. Domains targeted by the domain-specific computational lexicon can be adapted to provide a greater breadth of coverage by a NL parser.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    extracting a candidate token sequence comprising one or more word tokens from an unstructured domain glossary comprising a plurality of entries associated with a domain;
    performing a look-up operation to retrieve language data for each word token in the candidate token sequence;

annotating each word token in the candidate token sequence found by the look-up operation with corresponding retrieved language data to form an annotated sequence;

performing a pattern match of the annotated sequence relative to a repository of patterns;

identifying a best matching pattern from the repository of patterns to the annotated sequence based on matching criteria;

refining the annotated sequence with lexical information associated with the best matching pattern as a refined annotated sequence; and outputting the candidate token sequence and the refined annotated sequence to a domain-specific computational lexicon file.

2. The method of claim 1, further comprising:
pre-filtering the unstructured domain glossary to prevent an entry that fails to meet one or more well-formed entry criteria from being extracted as the candidate token sequence.

3. The method of claim 1, further comprising:
performing a morphological decomposition of the candidate token sequence to identify a base form of at least one of the word tokens in the candidate token sequence; and using the base form in the look-up operation.

4. The method of claim 1, further comprising:
annotating a word token in the candidate token sequence as being an unknown word token based on an inability of the look-up operation to locate language data about the word token.

5. The method of claim 4, further comprising:
applying a set of heuristics to attempt to resolve the unknown word token as a part of speech; and adding an entry to a lexical resource used for the look-up operation based on resolving the unknown word token.

6. The method of claim 1, further comprising:
performing a lexical phrase analysis of the annotated sequence to identify a candidate head of phrase; and augmenting the refined annotated sequence based on identifying the candidate head of phrase of the annotated sequence.

7. The method of claim 1, wherein the pattern matching attempts to resolve a part of speech for at least one word token in the annotated sequence having multiple candidate parts of speech.

8. The method of claim 1, further comprising:
repeating the extracting, the look-up operation, the annotating, and the pattern matching for additional candidate token sequences; and recording instances of the additional candidate token sequences with corresponding annotated sequences in a pattern analysis file based on determining that a matching pattern cannot be located in the repository of patterns.

9. The method of claim 8, further comprising adding one or more patterns from the pattern analysis file to the repository of patterns based on determining that the one or more patterns occur above a threshold number or frequency.

* * * * *